United States Patent [19]
Boger

[11] Patent Number: 5,988,586
[45] Date of Patent: Nov. 23, 1999

[54] LOW NOISE BALL VALVE ASSEMBLY WITH DOWNSTREAM INSERT

[75] Inventor: Henry William Boger, Foxboro, Mass.

[73] Assignee: Dresser Industries, Inc., Dallas, Tex.

[21] Appl. No.: 08/813,851

[22] Filed: Mar. 7, 1997

[51] Int. Cl.[6] .......................... F16K 47/02; F16K 47/14; F16L 55/027
[52] U.S. Cl. ................ 251/127; 138/42; 138/44
[58] Field of Search .................. 137/1, 625.32, 137/625.31; 251/127, 118; 138/46, 40, 42, 44

[56] References Cited

U.S. PATENT DOCUMENTS

| | | | |
|---|---|---|---|
| 1,144,306 | 6/1915 | Mock | 251/127 |
| 3,665,965 | 5/1972 | Baumann | 251/127 |
| 4,007,908 | 2/1977 | Smagghe et al. | 138/40 |
| 4,212,321 | 7/1980 | Hulsey . | |
| 4,295,493 | 10/1981 | Bey | 138/46 |
| 4,364,415 | 12/1982 | Polon . | |
| 4,402,485 | 9/1983 | Fagerlund | 251/127 X |
| 4,479,510 | 10/1984 | Bey . | |
| 4,530,375 | 7/1985 | Bey . | |
| 4,540,025 | 9/1985 | Ledeen et al. . | |
| 4,610,273 | 9/1986 | Bey . | |
| 4,691,894 | 9/1987 | Pyotsia et al. | 251/127 |
| 5,070,909 | 12/1991 | Davenport | 137/625.32 |
| 5,180,139 | 1/1993 | Gethmann et al. . | |
| 5,218,984 | 6/1993 | Allen . | |
| 5,287,889 | 2/1994 | Leinen . | |
| 5,332,004 | 7/1994 | Gethmann et al. . | |
| 5,400,825 | 3/1995 | Gethmann et al. . | |
| 5,495,872 | 3/1996 | Gallagher et al. | 138/40 |
| 5,772,178 | 6/1998 | Bey | 251/127 |

FOREIGN PATENT DOCUMENTS

| | | |
|---|---|---|
| 1200688 | 9/1965 | European Pat. Off. . |
| 101323 | 2/1984 | European Pat. Off. . |
| 0325846 | 11/1988 | European Pat. Off. . |
| 2352370 | 4/1975 | Germany . |
| 2402774 | 7/1975 | Germany ............................ 251/118 |
| 237241 | 8/1945 | Switzerland . |
| 520083 | 4/1940 | United Kingdom ................ 138/40 |

OTHER PUBLICATIONS

Neles Q–Ball Standard Product Range, Liquid Phase and Gas Phase/Flashing Phase
Soundtrim Modulating Low Noise Control Plug Valve, Bulletin V–37, Durco, Jun. 1987.
Series 61 and 62, High Performance Rotary Valves, INTROL, Kent Process Control, Inc., Sep. 1987.
Neles Control Valves for Gas Transmission and Distribution, Mar. 1989.
Reglerventilen Som Löser Problem Med Kavitation Och Reducerar Ljud, NAF– Trimball, NAF, Sep. 1988, NAF Enertech Group.

*Primary Examiner*—John Rivell
*Attorney, Agent, or Firm*—Haynes and Boone, LLP

[57] ABSTRACT

A valve assembly for controlling the flow of fluid through a conduit section having and an inlet and an outlet in which a ball valve having a through bore formed therein is rotatably mounted in the conduit section. The ball valve moves between an open position in which at least a portion of the bore registers with the inlet to permit the flow of the fluid through the ball valve, and a closed position in which fluid flow through the ball valve is prevented. An insert is disposed in the conduit section downstream of the ball valve, and a first series of passages are formed through the insert for receiving the fluid from the ball valve. At least one addition series of passages extend through the insert for receiving fluid from the first series of passages and discharging the fluid to the outlet, with the passages reducing the noise generated by the fluid flow.

19 Claims, 3 Drawing Sheets

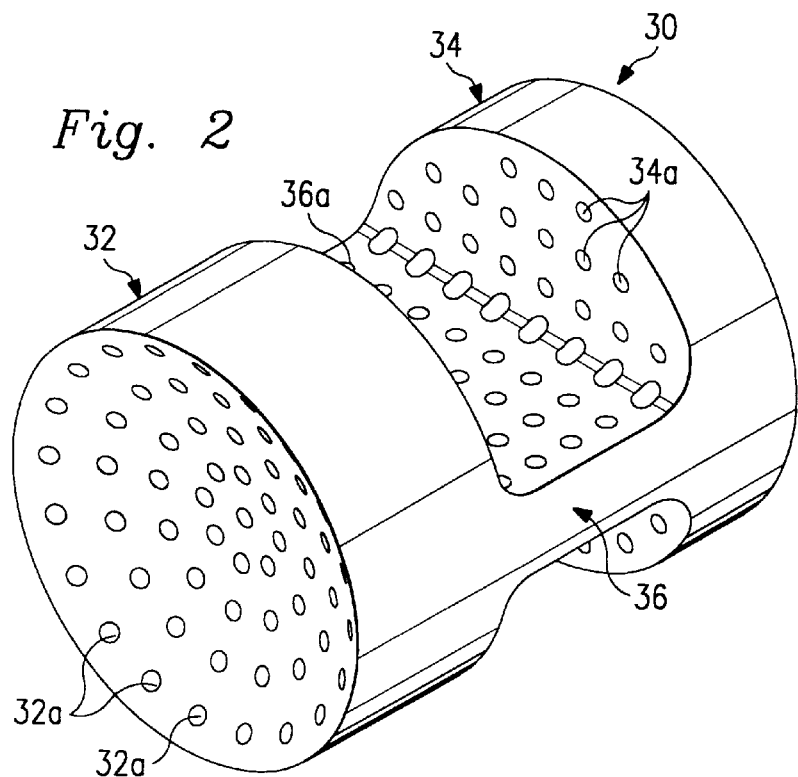
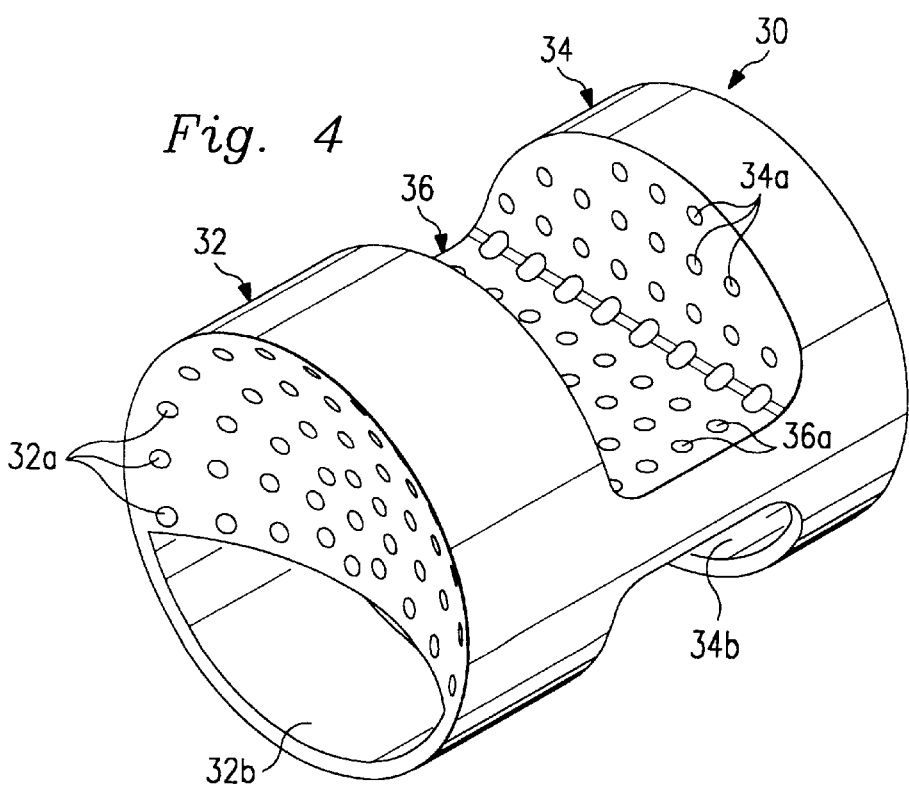

5,988,586

LOW NOISE BALL VALVE ASSEMBLY WITH DOWNSTREAM INSERT

BACKGROUND OF THE INVENTION

The present invention relates to a low noise ball valve assembly and, more particularly, to such an assembly for controlling the transmission and distribution of a compressible fluid.

In the transmission and distribution of compressible fluids, such as natural gas, there are requirements for valves that control a variable, such as pressure or flow rate, and operate at high pressure drops, that is, high pressure differentials between the upstream and downstream pressure. As such, these valves are fitted with actuators and positioners that respond to a control signal generated by a controller or computer.

When a compressible fluid is throttled through a control valve at a high pressure drop, noise is generated in the fluid aerodynamically, and subsequently is propagated through the fluid, exciting the pipe walls (principally downstream), thereby causing noise to be propagated to the surrounding atmosphere. The result may be noise that exceeds allowable limits for worker hearing conservation.

A second concern involved with the throttling of a compressible fluid through a control valve is that it often causes excessive mechanical vibration resulting in attendant problems with the proper operation of associated measuring and controlling equipment. In addition, the vibration can also cause fatigue failure of welds or piping.

Ball valves are frequently used for shutoff valves and for control valves for special applications, such as the transmission and distribution of natural gas. In order to reduce noise and mechanical vibration when ball valves are used, inserts have been placed in the ball valves which are provided with a plurality of relatively small passages through which the fluid passes under certain flow conditions. However the availability of inserts for ball valves that offer significant reduction of noise and mechanical vibration have been very limited.

Also, ball valves of the above type are often limited to applications in which there is a high pressure drop throughout the entire range of travel of the valve. In these cases, the valves are designed for the continuous reduction of noise and mechanical vibration over their entire range of travel.

However, there are applications that involve a relatively high pressure drop at relatively low flow rates and small valve openings, and a relatively low pressure drop at maximum flow and relatively large valve openings. In the latter, low pressure drop, situation, a flow capacity is required that is higher than would be possible utilizing a valve designed for continuous noise reduction based on a high pressure drop throughout the entire valve travel range.

Also, ball valves that have inserts of the above type that are welded, or otherwise attached, within a spherical ball, are difficult to manufacture and often cause distortion of the ball valve.

Therefore what is needed is a ball valve that can reduce noise at relatively low flow rates and small valve openings at relatively high pressure drops, yet can respond to relatively low pressure drop situations and achieve maximum flow. Still also needed is a ball valve of the above type that also reduces mechanical vibration, is relative easy to manufacture, and is not easily subjected to distortion.

SUMMARY OF THE INVENTION

The present invention, accordingly, provides a ball valve assembly for controlling the flow of fluid through a conduit section having and an inlet and an outlet. A ball valve having a through bore formed therein is rotatably mounted in the conduit section. The ball valve moves between an open position in which at least a portion of the bore registers with the inlet to permit the flow of the fluid through the ball valve, and a closed position in which fluid flow through the ball valve is prevented. An insert is disposed in the conduit section downstream of the ball valve, and a first series of passages are formed through the insert for receiving the fluid from the ball valve. At least one additional series of passages extend through the insert for receiving fluid from the first series of passages and discharging the fluid to the outlet.

Major advantages are achieved with the ball valve assembly of the present invention since two and three stage pressure reduction is achieved which minimizes noise generation in comparison to single stage reduction and which produces a substantially attenuated high peak frequency. Also, the noise and mechanical vibrations generated by the flow of the fluid is significantly reduced at relatively small valve openings and low flow rates; while according to one embodiment of the present invention, maximum flow can be achieved when the pressure drop is relatively low. Also, the ball valve assembly of the present invention is relatively easy to manufacture and reduces distortion of the ball valve.

BRIEF DESCRIPTION OF THE DRAWINGS

FIG. 2 is an isometric view of a component of the assembly of FIGS. 1A–1C.

FIG. 4 is an isometric view of a component of the assembly of FIGS. 3A–3C.

DESCRIPTION OF THE PREFERRED EMBODIMENT

Figure 1A:
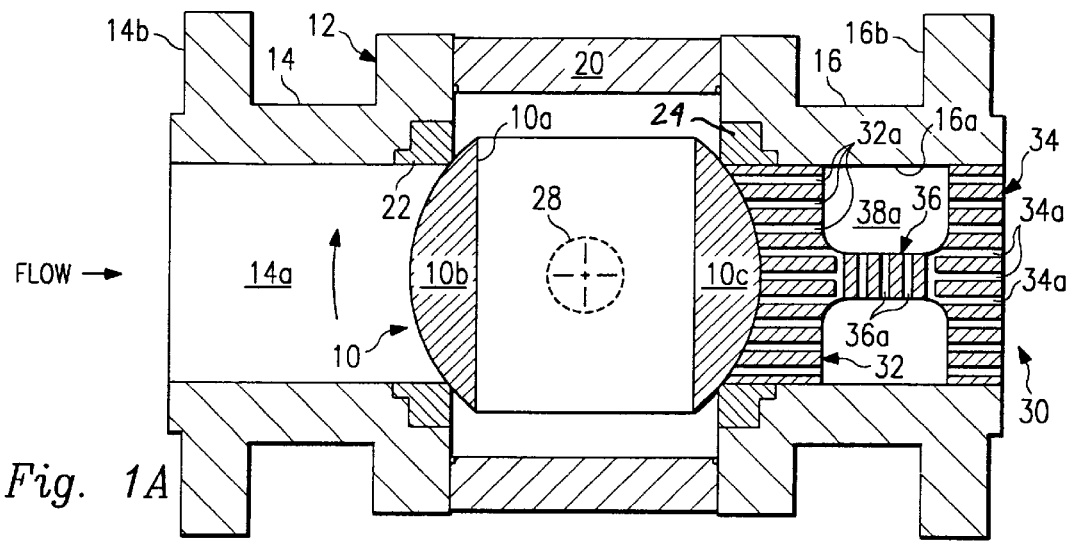
FIGS. 1A–1C are cross-sectional views depicting the ball valve assembly according to an embodiment of the present invention in three operating modes.

FIG. 1A of the drawings depicts an embodiment of the ball valve assembly of the present invention which includes a ball valve 10 disposed in a valve body 12 formed by a cylindrical inlet section 14. An inlet bore 14a extends through the inlet section 14 and a circular flange 14b is provided on the outer wall in the inlet section for connection to a inlet pipe (not shown) for supplying a compressible fluid, such as natural gas, to the inlet section. A cylindrical outlet section 16 is also provided which has an outlet bore 16a and a circular flange 16b formed on its outer wall for connection to a outlet pipe (not shown) for receiving the fluid from the outlet section.

An outer support ring 20 extends between the sections 14 and 16, with the inner surface of the ring in a spaced relation to the outer surface of the ball valve 10.

The support ring 20 is connected between the sections 14 and 16 in any known manner, such as by bolts, or the like (not shown).

A pair of axially-spaced seal assemblies 22 and 24 are mounted in circular notches or grooves, provided in the inner end portions of the inlet section 14 and the outlet section 16, respectively. The support ring 20 and the seal assemblies 22 and 24 will not be described in any further detail since they do not form any part of the present invention.

The valve 10 is in the form of a ball, or sphere, having a central through bore 10a. Thus, two solid portions 10b and 10c, each having a convex outer surface, are defined. In the closed position of the valve 10 shown in FIG. 1, the solid portion 20b blocks the flow of fluid from the inlet section 14 to the outlet section 16.

Figure 1B:
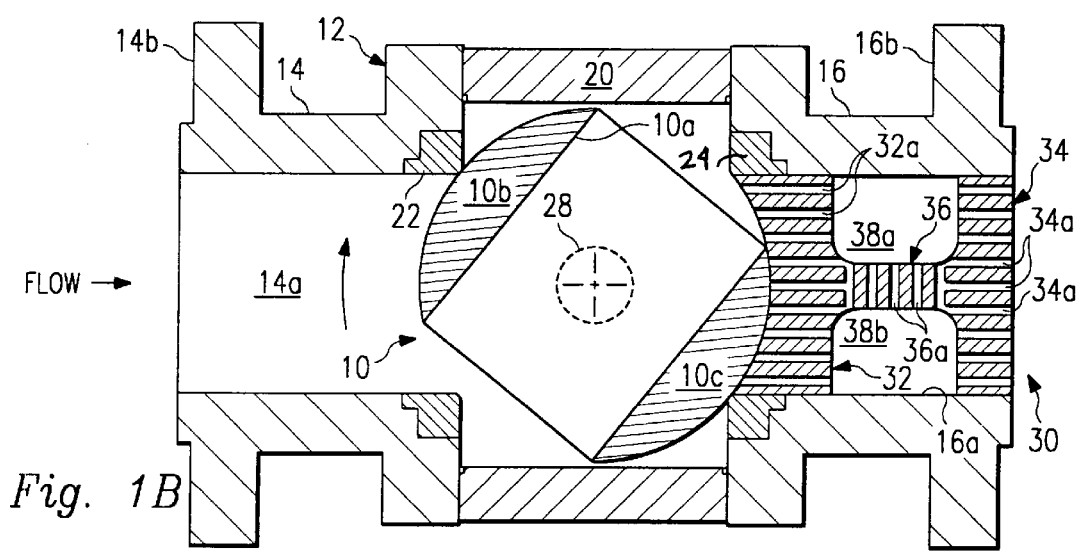
Figure 1C:
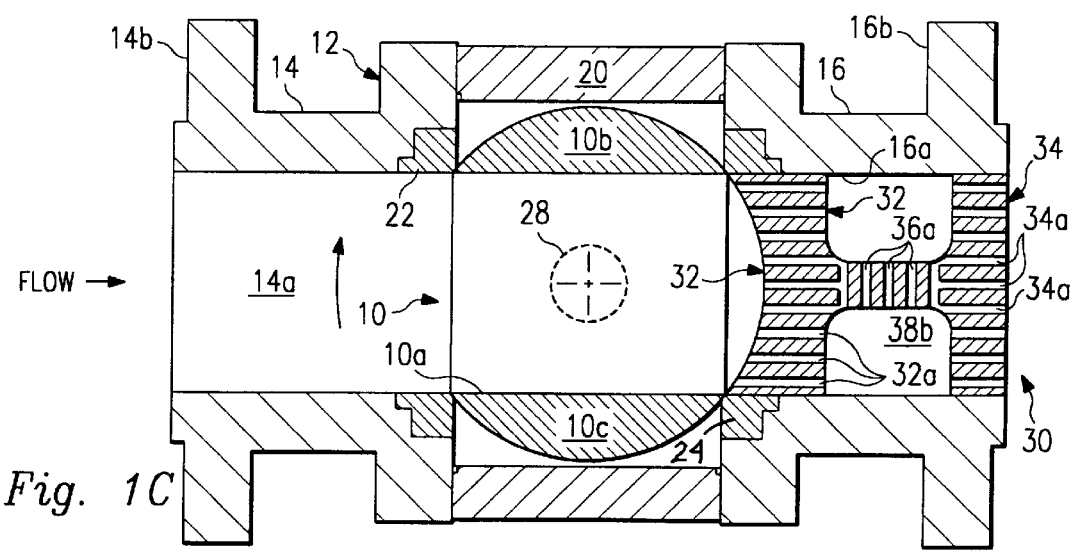

A pair of stems (one of which is shown in phantom lines and referred to by the reference numeral 28 in FIGS. 1A–1C), are connected to the outer surface of the ball valve 10 at diametrically opposite portions thereof to enable the ball valve to be rotated in a manner to be described. The stems 28 are connected to conventional ancillary equipment (not shown) that rotate the stems, and therefore the ball valve 10, about an axis coinciding with the axes of the stems, with the seals 22 and 24 functioning to provide a fluid seal, all in a conventional manner.

According to a feature of the present invention, as shown in FIGS. 1A–1C and 2, an insert 30 is provided in the bore 16a of the outlet section 16 just downstream of the ball valve 10, and is designed to reduce the noise generated as a result of the flow of fluid through the ball valve. The insert 30 includes a first disc portion 32, an outer surface of which is concave, with its curvature corresponding to the convex outer surface of the portion 10c of the ball valve 10. The insert 30 also includes a second disc portion 34 extending in a spaced, parallel relation to the first disc portion 32a and having a straight outer surface that extends flush with the outlet end portion of the outlet section 16. The insert 30 also includes a flat portion 36 extending perpendicular to, and connecting, the disc portions 32 and 34 and preferably formed integrally with the latter portions. The height of the flat portion 36 is considerably less that the inner diameter of the bore 16a so as to permit fluid flow between the spaced disc portions 32 and 34, as will be explained.

A series of spaced, parallel, through passages 32a, 34a and 36a are formed through the disc portions 32, 34, and 36, respectively, for permitting the flow of fluid into and through the bore 16a under conditions to be described. The passages 32a and 34b extend parallel with the axis of the bore 16a and the passages 36a extend perpendicular to the bore. The passages 32a, 34a and 36a have a relatively small diameter when compared to that of the bore 16a. An upper cavity 38a is formed in the bore 16a and extends above the disc portion 36 as viewed in the drawings and between the disc portions 32 and 34. Similarly, a lower cavity 38b is formed in the bore 16a and extends below the disc portion 36 and between the disc portions 32 and 34.

The ball valve 10 is depicted in its closed position in FIG. 1A in which the solid portion 10b blocks the flow of fluid from the inlet bore 14a through the valve 10. In the event fluid flow is desired, the valve 10 is rotated by rotating the valve stems 28 in a clockwise direction as shown by the arrows in FIGS. 1A and 1B until the bore 10a is exposed to the bore 14a. This also exposes one or more of the passages 32a of the disc portion 32 to the bore 10a, with the number of exposed passages depending on the degree of rotation of the ball valve 10. For example, and assuming that the valve is moved to the position of FIG. 1B, the fluid flows from the inlet bore 14a and into and through the exposed bore 10a of the ball valve 10. The fluid then passes from the bore 10a, through the exposed passages 32a in the upper portion of the disc portion 32, as viewed in FIG. 1B, and enters the upper cavity 38a. A portion of the fluid in the cavity 38a passes directly through the passages 34a in the upper portion of the disc portion 34 that register with the latter cavity. The remaining portion of the fluid in the cavity 38a passes through the passages 36a in the disc portion 36, then through the cavity 38b and the passages 34a in the lower portion of the disc portion 34 that register with the latter cavity. After passing through the passages 34a, the fluid exits the outlet section 16 and passes into the above-mentioned outlet pipe attached to the latter section.

If required by the operating conditions, the valve 10 is rotated in the clock-wise direction until it reaches the fully opened position shown in FIG. 1C. In this position, all of the passages 32a in the disc portion 32 are exposed to the fluid in the inlet bore 14a and the bore 10a of the ball valve 10. The fluid from the bore 10a thus passes through the all of the passages 32a of the disc portion 32. The fluid exiting the passages 32a in the upper portion of the disc portion 32 passes through the upper cavity 38a and then exits through the passages 34a in the upper portion of the disc portion 34 that register with the latter cavity. Similarly, the fluid exiting the passages 32a in the lower portion of the disc 32 passes into the lower cavity 38b and then exits through the passages 34a in the lower portion of the disc portion 34 that register with the latter cavity. The fluid exiting through the passages 34a of the disc portion 34 then passes to an outlet pipe, or the like, connected to the outlet section 16.

As a result of the above the ball valve assembly and method of the present invention achieves two and three stage pressure reduction which minimizes noise generation in comparison to single stage reduction and which produces a substantially attenuated high peak frequency. Another advantage of the ball valve assembly and method of the present invention is that the valve is operable over a relatively wide range of pressure drops and flow rates. Also, the noise and mechanical vibrations generated by the flow of the fluid is significantly reduced at relatively small valve openings and low flow rates and the assembly is relatively easy to manufacture and reduces distortion of the ball valve.

The embodiment of FIGS. 3A–3C and 4 is similar to that of FIGS. 1A–1C and 2 and contains essentially the same structure which is given the same reference numerals. According to the embodiment of FIGS. 3A–3C and 4, a portion of the through passages 32a and 42a of the disc portions 32 and 34, respectively are eliminated and two relatively large-diameter through passages, or openings 32b and 34b, respectively are provided. More specifically, the lower portion of the disc portion 32, as viewed in FIGS. 3A–3C and 4 has a relative large-diameter opening 32b formed therethrough which replaces a portion of the passages 32a in the previous embodiment. The remaining portion of the disc portion 32 is provided with the relatively small-diameter passages 32a as in the previous embodiment. Similarly, the lower portion of the disc portion 34 has a relative large opening 34b formed therethrough which replaces a portion of the passages 34a in the previous embodiment. The remaining portion of the disc portion 34 is provided with the relatively-small diameter passages 34a as in the previous embodiment.

Figure 3A:
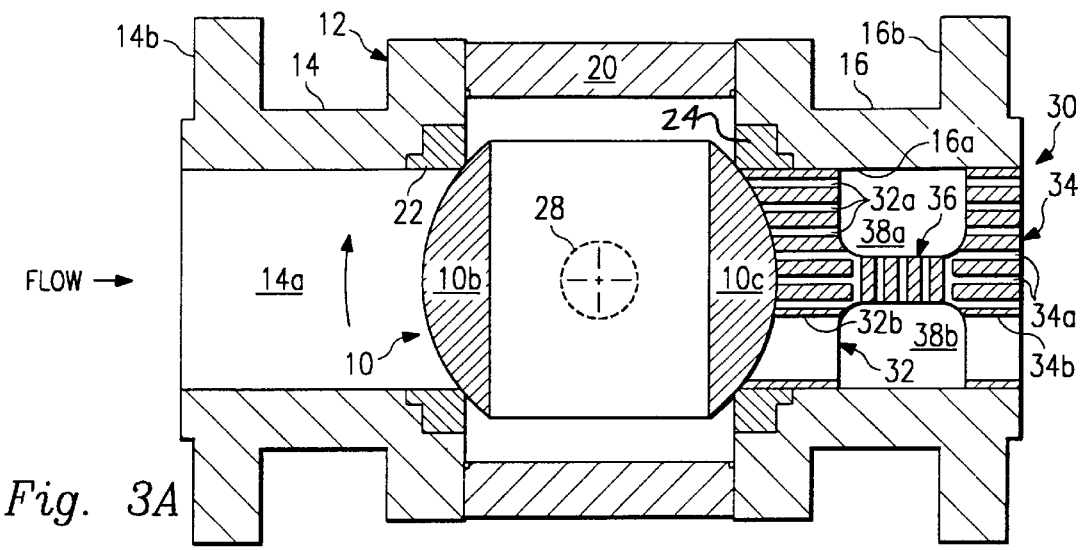
FIGS. 3A–3C are views similar to FIGS. 1A–1C, respectively, but depicting an alternate embodiment of the ball valve assembly of the present invention.

The ball valve 10 is depicted in its closed position in FIG. 3A in which the solid portion 10b blocks the flow of fluid from the inlet bore 14a through the valve 10. In the event fluid flow is desired, the valve 10 is rotated by rotating the valve stems 28 in a clockwise direction as shown by the arrows in FIGS. 3A and 3B until the bore 10a is exposed to the bore 14a. This also exposes one or more of the passages 32a of the disc portion 32 to the bore 10a, with the number of exposed passages depending on the degree of rotation of the ball valve 10. For example, and assuming that the valve is moved to the position of FIG. 3B, the fluid flows from the inlet bore 14a and into and through the exposed bore 10a of the ball valve 10. Form the bore 10a the fluid passes through the exposed passages 32a in the upper portion of the disc portion 32, as viewed in FIG. 3B, and enters the cavity 38a.

A portion of the fluid in the cavity 38a passes directly through the passages 34a in the upper portion of the disc portion 34 that register with the latter cavity. The remaining portion of the fluid in the cavity 38a passes through the passages 36a in the disc portion 36, then through the cavity 38b and the relatively large passage 34b. After passing through the passages 34a and 34b, the fluid exits the outlet section 16 and passes into the above-mentioned outlet pipe attached to the latter section.

Figure 3B:
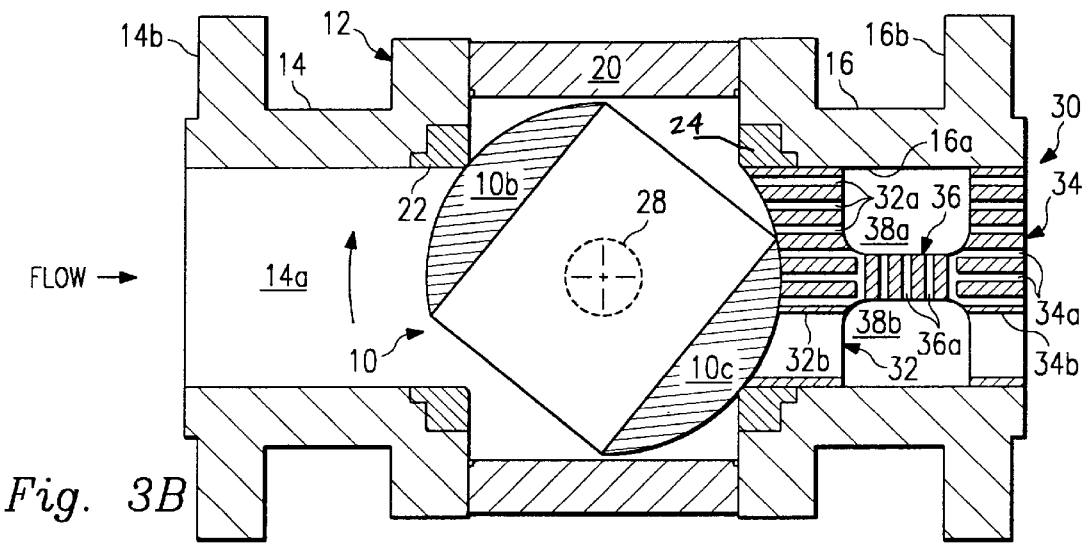

In the event full flow is desired the ball valve 10 is rotated further in the clock-wise direction until it reaches the fully opened position shown in FIG. 3B. In this position, all of the passages 32a, as well as the large opening 32b are exposed to the fluid in the inlet bore 14a. Since the large openings 32b provides the least resistance to fluid flow, the major portion of the fluid flows from the inlet bore 14a, through the bore 10a of the ball valve 10, through the opening 32b, through the lower cavity 38b and exits through the relatively large passage 34b.

Figure 3C:
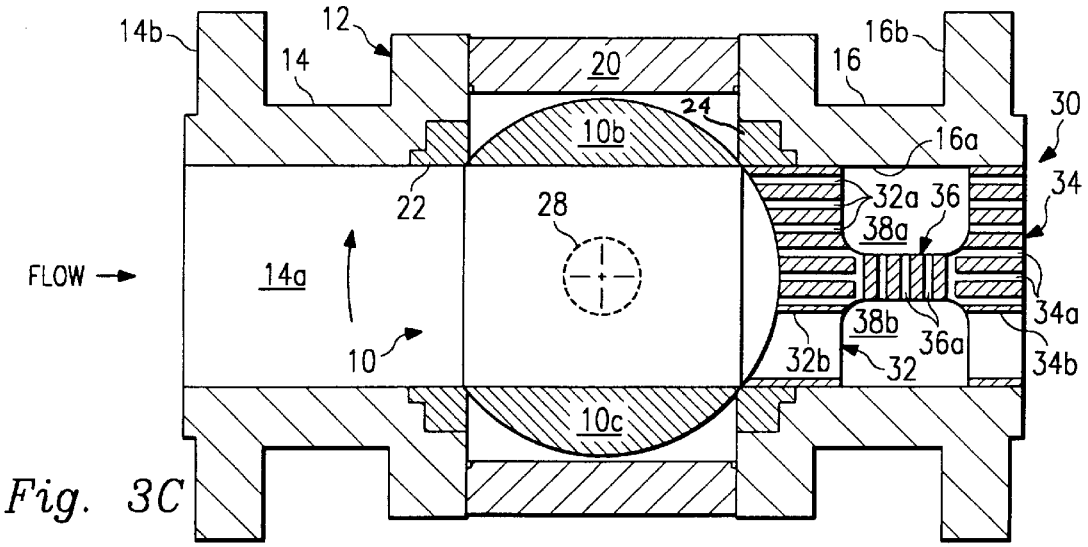

Thus, according to the embodiment of FIGS. 3A–3B and 4, substantial noise reduction is provided at the partial opening of the valve as shown by way of example in FIG. 3B; while in the fully opened position shown in FIG. 3C, high flow capacity is achieved (with reduced noise reduction) by virtue of the flow through the relatively large openings 32b and 34b. Therefore, this embodiment enjoys all of the advantages of the embodiment of FIGS. 1A–1C and 2 and, in addition, is embodiment is especially suited for applications in which a relatively high pressure drop occurs at relatively low opening of the valve 10, and the pressure drop lowers to a relatively low value as the valve opening increases.

It is understood that variations may be made in the foregoing without departing from the scope of the invention. For example, the present invention is not limited to the specific shape of the insert 30 shown and described above. For example, the insert to take a generally conical shape within the scope of the invention. Other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A valve assembly for controlling the flow of fluid through a conduit section having an inlet and an outlet, the valve assembly comprising a ball valve having a through bore formed therein, the ball valve being rotatably mounted in the conduit section between an open position in which at least a portion of the bore registers with the inlet to permit the flow of the fluid through the ball valve, and a closed position in which fluid flow through the ball valve is prevented; and insert disposed in the conduit section downstream of the ball valve, the insert comprising a first portion having an outer diameter substantially corresponding to the inner diameter of the bore and exposed to the ball valve, a second portion having an outer diameter substantially corresponding to the inner diameter of the bore and exposed to the outlet, a third portion extending between the first portion and the second portion and having an outer dimension less than that of the diameter of the bore, a first series of passages extending through the first insert portion, a second series of passages extending through the second insert portion, and a third series of passages extending through the third insert portion; the first series of passages receiving the fluid from the ball valve, the second series of passages receiving the fluid from the first series of passages, and the third series of passages receiving the fluid from the second series of passages and discharging the fluid to the outlet,the passages reducing the noise generated by the fluid flow.

2. The assembly of claim 1 wherein the third insert portion connects the first and second insert portions.

3. A valve assembly for controlling the flow of fluid through a conduit section having an inlet and an outlet, the valve assembly comprising a ball valve having a through bore formed therein, the ball valve being rotatably mounted in the conduit section between an open position in which at least a portion of the bore registers with the inlet to permit the flow of the fluid through the ball valve, and a closed position in which fluid flow through the ball valve is prevented; and an insert disposed in the conduit section downstream of the ball valve, the insert comprising a first portion having an outer diameter substantially corresponding to the inner diameter of the bore and exposed to the ball valve, and a second portion having an outer diameter substantially corresponding to the inner diameter of the bore and exposed to the outlet, a plurality of relatively small-diameter passages and one relatively large-diameter passage extending through the first insert portion for receiving the fluid from the ball valve, and a plurality of relatively small-diameter passages and one relatively large-diameter passage extending through the second insert portion for receiving fluid from the first series of passages and discharging the fluid to the outlet, the passages reducing the noise generated by the fluid flow.

4. The assembly of claim 3 wherein upon rotation of the ball valve from its closed position to its open position, the small-diameter passages in the first insert portion receive fluid from the ball valve before the large-diameter passage in the latter insert portion.

5. The assembly of claim 4 wherein, upon rotation of the ball valve to its fully opened position, the relative small-diameter and the relatively large diameter passages in the first and second insert portions are exposed to the ball valve and to the outlet, respectively, so that a substantial portion of the fluid flows through the relatively large-diameter passages in the first and second insert portions.

6. A valve assembly for controlling the flow of fluid through a conduit section having an inlet and an outlet, the valve assembly comprising a ball valve having a through bore formed therein, the valve being rotatably mounted in the conduit section between an open position in which at least a portion of the bore registers with the inlet to permit the flow of the fluid through the ball valve, and a closed position in which fluid flow through the ball valve is prevented; and an insert disposed in the conduit section downstream of the ball valve, a first series of passages extending through the insert for receiving the fluid from the ball valve, a second series of passages extending through the insert for receiving fluid from the first series of passages and discharging the fluid to the outlet, and a third series of passages extending through the insert and between the first and second series of passages, the first and second series of passages each including a plurality of relatively small-diameter passages and at least one relatively large-diameter passage, and the third series of passages having relatively small-diameters, the passages reducing the noise generated by the fluid flow.

7. A method of controlling the flow of fluid through a relatively large-diameter conduit having an inlet and an outlet and a ball valve disposed therein for receiving the fluid from the inlet, comprising the steps of providing a first series of relatively small-diameter passages in the conduit downstream of the ball valve for receiving fluid from the ball valve; providing a second series of relatively small-diameter passages in the conduit located downstream of the first series of passages and extending at an angle to the first series of passages, the second series of passages receiving fluid from the first series of passages and discharging the fluid to the outlet; and providing a cavity extending between the first and second series of passages, wherein the fluid flows from the first series of passages, through the cavity, and through the second series of passages to reduce the noise generated by the fluid flow.

8. The method of claim 7 further comprising the step of providing a third series of passages extending in an axially-spaced relation to the first series of passages and at an angle to the second series of passages so that the fluid flows from the first series of passages through the second and the third series of passages.

9. A method of controlling the flow of fluid through a relatively large-diameter conduit having a inlet and an outlet and a ball valve disposed therein for receiving the fluid from the inlet and being rotatable between an open position in which at least a portion of its bore registers with the inlet to permit the flow of the fluid through the ball valve, and a closed position in which fluid flow through the ball valve is prevented, the method comprising the steps of providing a first series of relatively small-diameter passages in the conduit downstream of the ball valve for receiving fluid from the ball valve; providing a second series of relatively small-diameter passages in the conduit located downstream of the first series of passages and extending at an angle to the first series of passages, the second series of passages receiving fluid from the first series of passages and discharging the fluid to the outlet, the passages reducing the noise generated by the fluid flow; and providing at least one relatively large-diameter passage in the conduit downstream of the ball valve for receiving fluid from the ball valve, wherein, upon rotation of the ball valve from its closed position to a partially opened position, the relative small-diameter passages of the first series of passages are initially exposed to the ball valve before the relatively large-diameter passage so that the fluid flows from the ball valve through the relatively small-diameter passages.

10. The method of claim 9 wherein the large-diameter passage is in the first series of passages and further comprising the steps of providing a third series of relatively small-diameter passages in the conduit located downstream from the second series, the third series receiving fluid from the second series and discharging the fluid to the outlet, and providing a large-diameter passage in the third series of passages so that, upon rotation of the ball valve to its fully opened position, a substantial portion of the fluid flows through the relatively large-diameter passages.

11. A valve assembly for controlling the flow of fluid through a conduit section having an inlet and an outlet, the valve assembly comprising a ball valve having a through bore formed therein, the valve being rotatably mounted in the conduit section between an open position in which at least a portion of the bore registers with the inlet to permit the flow of the fluid through the ball valve, and a closed position in which fluid flow through the ball valve is prevented; and an insert disposed in the conduit section downstream of the ball valve for reducing noise generated by the fluid flow, the insert comprising a first portion having an outer diameter substantially corresponding to the inner diameter of the bore and exposed to the ball valve, a second portion having an outer diameter substantially corresponding to the inner diameter of the bore and exposed to the outlet, a third portion extending between the first and second portions, a first series of passages extending through the first insert portion for receiving the fluid from the ball valve, a second series of passages extending through the second insert portion and in an axially-spaced relation to the first series of passages, and a third series of passages extending through the third insert portion and at an angle to the first and second series of passages, the third series of passages receiving the fluid from the first series of passages and the second series of passages receiving the fluid from the third series of passages and discharging the fluid to the outlet.

12. The assembly of claim 11 wherein the third insert portion connects the first and second insert portions.

13. The assembly of claim 11 further comprising a cavity extending between the first, second, and third insert portions and wherein the fluid flows from the first series of passages through the cavity, and through the second and third series of passages.

14. The assembly of claim 11 wherein the first and second insert portions each have a plurality of relatively small-diameter passages and one relatively large-diameter passage.

15. The assembly of claim 14 wherein, upon rotation of the ball valve from its closed position to its open position, the small-diameter passages in the first insert portion receive fluid from the ball valve before the large-diameter passage in the latter insert portion.

16. The assembly of claim 15 wherein, upon rotation of the ball valve to its fully opened position, the relative small-diameter and the relatively large diameter passages in the first and second insert portions are exposed to the ball valve and to the outlet, respectively, so that a substantial portion of the fluid flows through the relatively large-diameter passages in the first and second insert portions.

17. A valve assembly for controlling the flow of fluid through a conduit section having an inlet and an outlet, the valve assembly comprising a ball valve having a through bore formed therein, the valve being rotatably mounted in the conduit section between an open position in which at least a portion of the bore registers with the inlet to permit the flow of the fluid through the ball valve, and a closed position in which fluid flow through the ball valve is prevented; and an insert disposed in the conduit section downstream of the ball valve and comprising a first series of passages extending through the insert for receiving the fluid from the ball valve, a second series of passages extending through the insert and at an angle to the first series of passages for receiving the fluid from the first series of passages, and a third series of passages extending in an axially-spaced relation to the first series of passages and at an angle to the second series of passages, the third series of passages receiving the fluid from the first and second series of passages and discharging the fluid to the outlet, the first and third series of passages each including a plurality of relatively small-diameter passages and at least one relatively large-diameter passage.

18. The assembly of claim 17 wherein the second series of passages are relatively small-diameter passages.

19. The assembly of claim 17 wherein the angle is substantially ninety degrees.

* * * * *